Patented Jan. 21, 1936

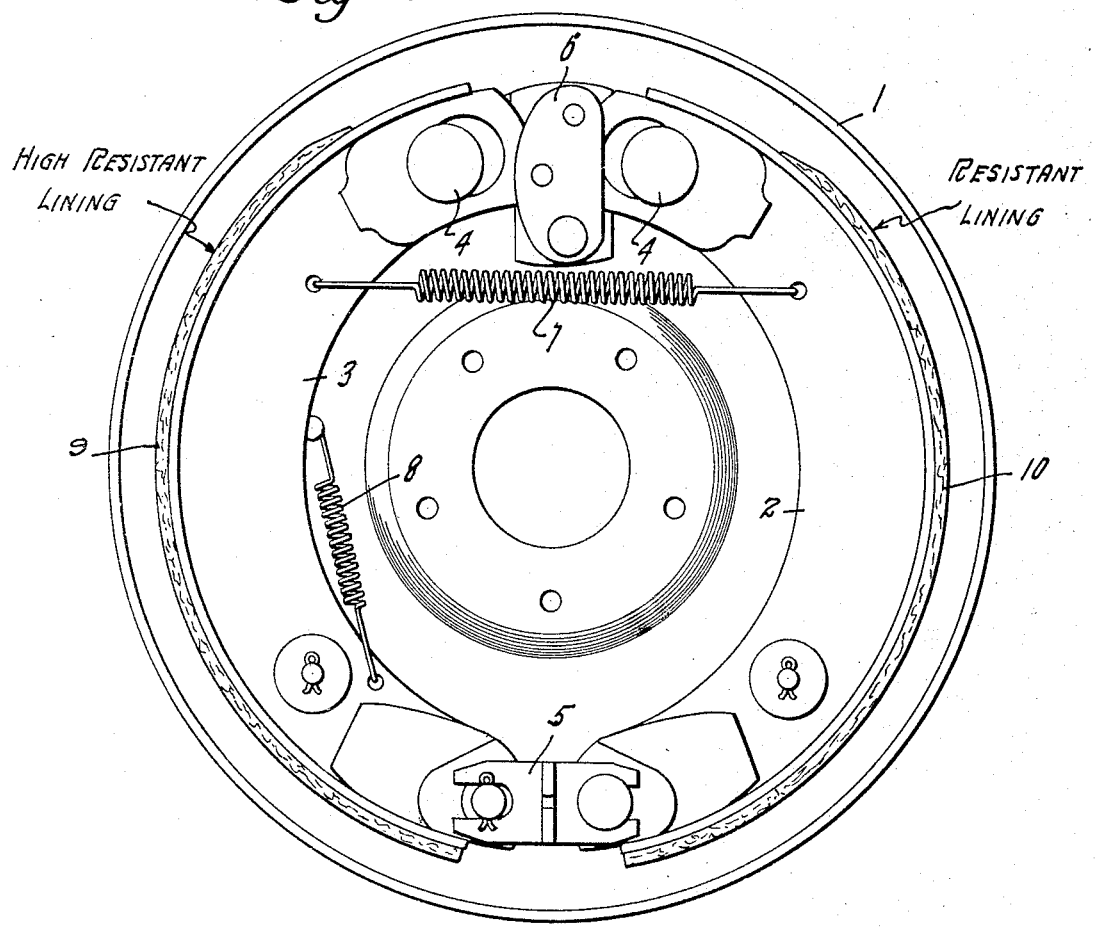

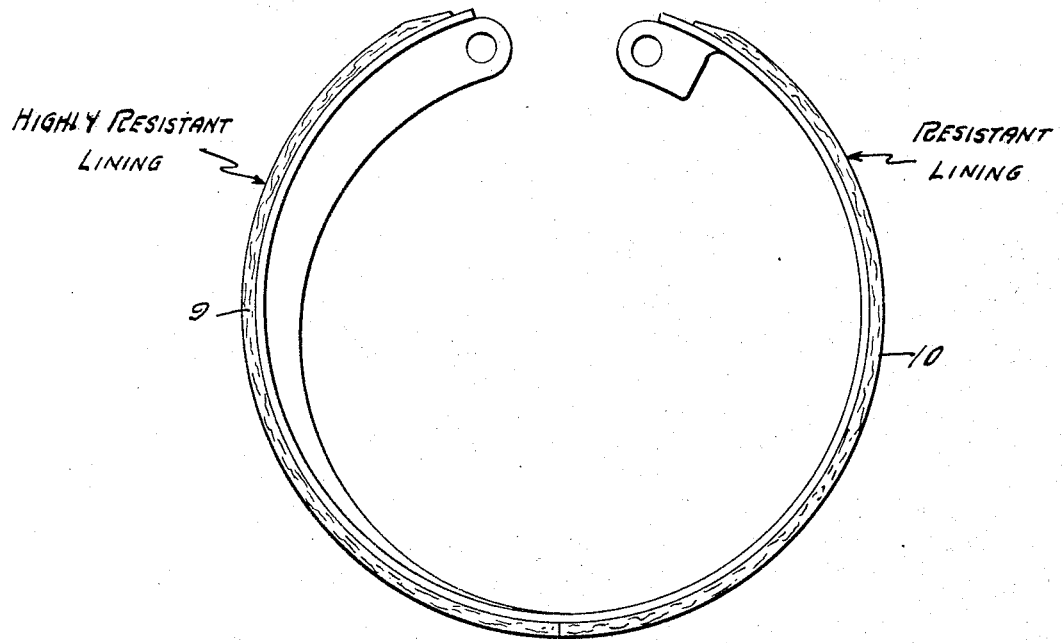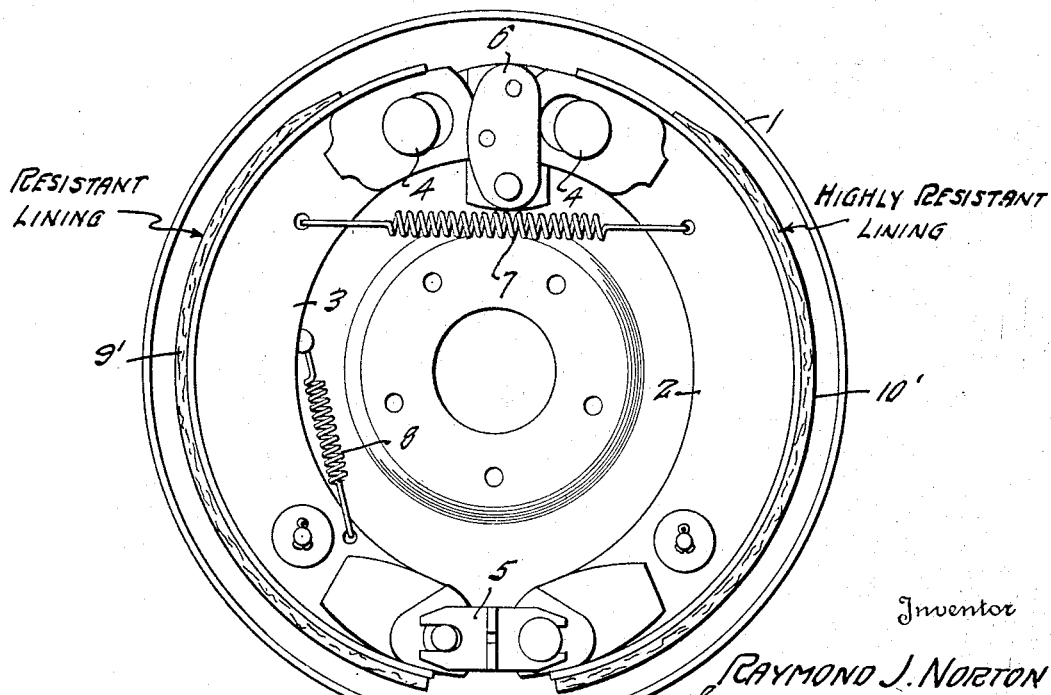

2,028,621

UNITED STATES PATENT OFFICE 2,028,621

BRAKE APPARATUS

Raymond J. Norton, Washington, D. C., assignor to Bendix Brake Company, South Bend, Ind., a corporation of Illinois Application June 16, 1931, Serial No. 544,898

1 Claim. (Cl. 188—78)

This invention relates to brake apparatus and more particularly to an improved type of servo brake.

A well known type of brake employed on automotive vehicles is the servo brake. As installed this includes either a two shoe duo type servo or a three shoe brake. The servo brake may also be made up by employing a single continuous band, one portion of which is rigidified to make it substantially inflexible and rigid and another portion of which is permitted to be flexible to perform the servo function.

In the ordinary operation of a servo brake, as for example a duo-servo, the brake as a whole is anchored at one end and expanded at the other. The non-servo or loaded shoe is connected to a return spring which withdraws it from the drum and permits the servo shoe to be applied first. This servo shoe, tending to rotate with the rotating drum, exerts an applying force upon the secondary shoe, which overcomes the force of the return spring and causes the operation of the secondary or loaded shoe. Whereas the applying force to the servo shoe is largely that developed by the cam or equivalent applying means, the applying force on the loaded shoe and hence the brake effect is a function of the force applied by the servo shoe, which depends to a large extent on the speed of the vehicle. During the greater part of normal braking, therefore, the loaded shoe applies a greater thrust or torque to the drum, for a given size or area, than does the servo shoe.

As a result of this, in many installations the lining upon the loaded shoe tends to wear down faster than the lining of the servo shoe. It is advantageous to so construct the brake that the lining of the two shoes, in the case of a duo-servo brake, wears down substantially equally. This secures substantially equal clearance throughout the circumference of the drum and renders adjustments more accurate.

It is an object of the present invention to provide a new type of servo braking mechanism.

Yet another object is to equalize the wear of friction facings employed on brakes of the servo type.

Still another object is to provide a brake of the servo type in which differential lining sections are employed.

Still another object is to generally improve the braking efficiency of brakes of the servo type to obtain substantially uniform wear of the lining throughout.

In order to enable a more ready understanding of the invention a typical physical embodiment is shown in the accompanying drawing in which:

Fig. 1 is a side elevation of a brake in which one modification of the invention is shown.

Fig. 2 is an elevation of another form of the invention; and

Fig. 3 is a view similar to Fig. 1 of a further modification.

As shown in the drawings, the invention may be embodied in a brake apparatus of the well known type. This may comprise a backing plate 1 which serves to mount the brake structure. The brake shoe structure, as is understood, coacts with a brake drum (not shown).

The brake structure proper comprises a servo or loading shoe 2 and a loaded shoe 3. While the invention is described with relation to a brake of the duo-servo type, it is obvious that it may be applied to a brake structure having three or more shoes, or to one embodying a single continuous band formed with a flexible servo portion and a relatively rigid loaded section as shown in Fig. 2.

The shoes 2 and 3 are anchored on the anchor pins 4 and adjacent the anchor pins are provided with slots for movement relative to the anchor pins. The shoes 2 and 3 are respectively pivoted together at the joints shown generally by the numeral 5.

These shoes may be applied in any desired manner, as for example in the well known floating lever operator 6. The shoes 2 and 3 are retracted into the inoperative position by the return spring 7. A return spring 8 is provided which acts upon the unanchored end of the loaded shoe and serves to withdraw this end of the shoe from the drum. This spring likewise functions to hold the unanchored end of the loaded shoe away from the drum until the force applied to its unanchored end by the servo shoe is of a certain predetermined magnitude. The servo shoe 2 is applied first and a considerable braking action is obtained by this shoe without applying the loaded shoe. When, however, the operator 6 is actuated to a sufficient degree so that the thrust applied to the end of the loaded shoe through the linkage 5 is greater than the restrictive forces of the spring 8, the loaded shoe 3 is then applied. The thrust imparted by this loaded shoe 3 then becomes largely a function of the speed of the rotating drum.

In normal circumstances, as shown in Fig. 1, when the spring 8 is made relatively light, operation of the brake pedal will cause movement of both the shoes 2 and 3. Since the braking thrust of the brake shoe 3 is a function of the speed of the vehicle, during normal rigorous braking the total braking torque exerted by this shoe will be greater than the servo shoe 2, assuming the two shoes are of equal size. In these circumstances, therefore, the brake lining attached to the loaded shoe 3 will wear down to a greater extent than the similar lining attached to the servo shoe 2.

According to the present invention the disadvantages accruing from this unequal wear are obviated by attaching to the loaded shoe 3 a lining 9 of high wear resistance. The servo shoe 2 is provided with a friction facing 10 which, while resistant enough to properly subserve its function, is nevertheless less resistant than the lining 9 of the loaded shoe. Therefore, in normal brake operations the tendency of the lining on the loaded shoe to wear down faster than that on the servo shoe is, so-to-speak, overcome by making this lining more resistant to wear. When the lining 9 is made thus more wear resistant, the effects of the increased braking torque exerted by the shoe 3 with respect to the shoe 2 are compensated. The wear on the two linings therefore are thus equalized.

The methods of increasing the wear resistance of the lining 9 will readily suggest themselves to those skilled in the art. For example the lining 10 may be made of a relatively soft material such as the typical woven lining, and lining 9 may be made of a harder and more resistant molded product. Or, if desired, the two products may be of molded construction but the element 9 may be so formed as to make it more resistant to wear than lining 10, as for example by incorporating a larger quantity of metallic filling material or by constructing the lining 9 with a resin binder which is in fact harder and more infusible than the binder of the lining 10. With this type of construction, it will be appreciated that the total extent of wear on the two shoes may be equalized despite the greater braking thrust applied by one of the shoes.

As noted above, and as shown in Fig. 3 the brake may be in fact so constructed that a greater degree or extent of wear is taken by the servo shoe than the loaded shoe. Thus the spring 8 may be made of such strength that a forceful application of the brake pedal is necessary in order to apply the secondary shoe 3. In these circumstances a relatively small pedal pressure will insure only the application of the brake shoe 2. Therefore during the normal life of the drum the brake shoe 2 would be applied many times more than the brake shoe 3. The wear of the lining, which of course is a function of the times it contacts with the brake drum, will be much greater on the servo shoe than on the loaded shoe.

In accordance with the invention when this type of brake is used, namely one in which the servo shoe may and does apply a braking force of considerable value without the application of the secondary shoe, special friction facings are employed. For this type of brake the friction facing 10' is made more wear resistant than the friction facing 9' so as to compensate for the increased degree of wear to which it is subjected. With the degree of wear resistance of the lining 10' properly chosen at a value sufficiently greater than that of the lining 9', the total wear of the two linings may be made substantially equal. With this type of structure, therefore, two friction facings tend to wear down to an equal degree or extent and a uniform clearance is maintained for the shoes considered in toto, thereby enabling accurate adjustment through all degrees of wear.

It will therefore be seen that the principles of the invention may be embodied in different types of brakes and the difference in wear resistance of the sections of the lining will depend upon the degree and amount respectively of the separate shoes with separate sections constituting the brake shoe and assemblage.

It will be obvious, of course, that when a single continuous band is employed as a brake shoe structure, the shoe may be provided with two or more pieces of friction material of relatively different degrees of hardness or wear resistance. As in the case of the pivoted shoe structure, the wear resistant lining will be associated with that portion or section of the shoe which transmits the greatest total braking torque.

While preferred modifications of the invention have been described, it is to be understood that these are given merely by way of example and only to illustrate the principle involved, namely the conforming of the lining of a section of a servo brake so that the friction facing considered as a whole wears down to a substantially equal extent to thereby insure uniform clearance throughout the life of the brake lining.

I claim:

A brake apparatus comprising a drum, a nonrotating friction means within the drum comprising a single continuous band, said band including a relatively flexible loading part and a relatively rigid loaded part, a friction facing of highly wear resistant material secured to the loaded part and a friction facing of less wear resistant material attached to the loading part to equalize the extent of wear on the parts.

RAYMOND J. NORTON.